United States Patent
Zenz

[11] 3,770,388
[45] Nov. 6, 1973

[54] GRANULAR BED FILTER REACTOR

[76] Inventor: Frederick A. Zenz, Rt. 9D, Garrison, N.Y. 10524

[22] Filed: May 24, 1971

[21] Appl. No.: 146,379

[52] U.S. Cl................ 23/284, 23/288 R, 23/288 G, 55/96, 55/98, 55/302, 55/303, 55/474, 34/171, 34/174, 34/178

[51] Int. Cl................................................. B01j 9/02

[58] Field of Search.............. 23/284, 288 R, 288 G; 55/96, 98, 302, 303, 474; 34/174, 171, 178

[56] References Cited
UNITED STATES PATENTS

| | | | |
|---|---|---|---|
| 3,296,775 | 1/1967 | Squires | 23/288 R |
| 2,493,218 | 1/1950 | Bergstrom | 34/174 UX |
| 2,641,364 | 6/1953 | Depallens | 55/302 X |

*Primary Examiner*—James H. Tayman, Jr.
*Attorney*—William P. Keegan

[57] ABSTRACT

A granular bed filter-reactor in which mechanical means are provided to limit the amount of filter media removed during a blow back operation.

5 Claims, 4 Drawing Figures

PATENTED NOV 6 1973 3,770,388

INVENTOR
FREDERICK A. ZENZ

BY William P. Keegan
ATTORNEY

GRANULAR BED FILTER REACTOR

This invention relates to granular bed filter - reactors and especially to those in which the filter medium might have a catalytic, or adsorbent, or other reactive function to perform.

In the art of granular bed filters, there are disclosed filters in which the bed material simply screens or filters out particulate pollutants carried by the fluid stream to be filtered. For example, fly ash from a power plant stack will be trapped by the bed material as the stack gases pass through a granular bed filter. In such cases it is preferred to clean the granular bed without the necessity of removing any of the filter media from the filter and for this reason the method and apparatus disclosed in my earlier U.S. Pat. No. 3,410,055 is particularly applicable. In that patent, an arrangement is disclosed in which the filter media is restrained between porous elements so that when a reverse flow of clean gas is blown back through the filter, the filter media is fluidized and the particulates filtered thereby and generally formed as filter cake on the front surface of the filter bed are blown out of the input ports of the filter.

While the method and apparatus thus disclosed should in principle be eminently satisfactory for the filtering of particulate matter from fluid streams, it is also the case that in many filtering applications the filter media might have catalytic, adsorbant or other reactive characteristics with the fluid stream passing therethrough. In such case it would be desirable to remove the filter media from the filter so that it could be regenerated or, if this is not possible, replaced by fresh material. Also, if the filter media did not react with the fluid stream, the particulate matter carried thereby might be sticky so as to adhere to the filter media and thereby resist being dislodged from the filter media by a blast of clean blow back gas.

In applications of the type just alluded to, a common expedient would be to have the filter media flow continually through the filter. However, such an arrangement is not desirable since it involves the transport of all of the filter media and not just that portion of it which has reacted with the fluid stream or been contaminated with sticky particulate material. It is much more desirable to remove only the spent filter material thus minimizing the need to transport or circulate fresh filter media. Squires U.S. Pat. No. 3,296,775 related to this problem and proposed that a controlled pulse of blow back gas be utilized to control the amount of filter media expelled from the filter.

The present invention contemplates an essentially mechanical means for limiting the amount of filter media removed from the filter during a blow back cleaning operation.

In carrying out the invention there is provided a filter element in which the inlet side comprises a series of generally horizontal slats or louvres arranged one above another in spaced apart relationship. A screen member having perforations, of a size smaller than that of the granules of the filter media so as to limit passage of filter media through the perforations, extends from near the top of each slat to below the bottom edge of the slat next above. The arrangement is such, i.e., the width of each slat, its angular position, the spacing between slats, and the size of the opening between a screen member and the slat next above, that a limited amount of filter media is supported on the inlet side of the screen member. Thus when it is desired to clean the filter by blowing back through the filter, only the filter media supported on the screen member is removed from the filter element. When the blow back ceases, the removed filter media is replaced by fresh material which flows through the space between the bottom of one slat and the screen member and onto the screen member. The removed filter media can be regenerated or cleaned of particulate matter as the case may be and then recirculated as fresh filter media.

Features and advantages of the invention may be gained from the foregoing and from the description of a preferred embodiment thereof which follows.

Figure 1:
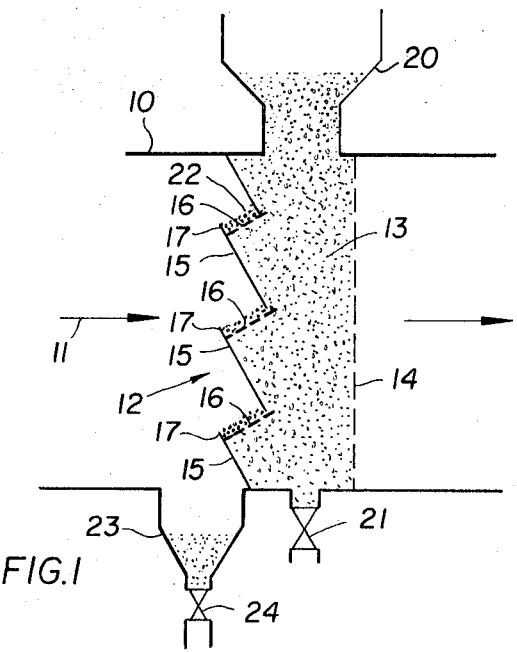
FIG. 1 is a schematic representation of a granular bed filter embodying the invention.

The basic principal of the invention will best be gained from a description of FIG. 1 which schematically represents one embodiment of the invention as it pertains to the filtration of particulate dust from a feed gas stream. This will illustrate the operative principle so that its application to other processes will readily be suggested and apparent.

A dusty feed gas is fed through a duct 10 in the direction of the arrow 11. The gas passes through filter element 12 which comprises a thin bed of granular solids 13 maintained in place by a porous membrane 14, such as a wire mesh screen, on the downstream side of the element 12 and by a series of angularly disposed horizontal slats or louvres 15 on the inlet side of element 12. The granular solids may be sand or other inert material if particulate matter is to be filtered, but it could also be an active agent if a reactive operation is to be performed. The louvres 15 are shown as solid elements but they could be formed of a mesh screen as is membrane 14 so long as the apertures, as those in membrane 14, are smaller than the diameter of the granules making up bed 13. A filter inlet screen 16 is provided at each inlet port to filter element 12. Its apertures are also sized that the bed granules will not pass through the screen. Screens 16 are joined below the leading edges of their associated louvres 15 such that a lip 17 is formed on each louvre which will retain bed granules supported atop screen 16. At its rear edge screen 16 is spaced from the trailing edge of the louvre next above it, although it could be joined to the trailing edge of a louvre so long as there are openings in the louvre to permit granular material from bed 13 to slide on to the top of screen 16. The angle that screen 16 makes with the horizontal will be at least equal to, preferably but slightly greater than, the angle of repose for the material used as filtering bed 13. In this way a sufficient supply of granular material will flow by gravity from the filter bed 13 through the openings provided until it covers screen 16 and is retained by lip 17.

The filter element bed 13 is fed by gravity from an overhead hopper 20 so that the bed may be replenished when desired. This may be done when the bed is intentionally drained through valve 21 or when bed material is lost through a bed cleaning operation hereinafter described.

When operating as a filter, a cake of separated particulate matter will form on the exposed surfaces 22 of bed 13. This collected filter cake will clog the interstices between the granular material of bed 13 and will eventually lead to an excessive pressure drop in element 12 thus requiring cleaning of the bed.

Now if we assume that filter 12 is to be used to filter particulate matter from a feed gas flowing through duct 10, the feed gas will enter the filter through the exposed surfaces 22 and the particulate matter will collect there as filter cake. The filtering action will continue until the pressure drop through the filter becomes objectionable at which time a cleaning operation will be undertaken. This operation will consist of blowing back a clean gas through filter 12 from the exit side of the filter. Only the bed granules, plus filtered particulates, lying on the outside of the upper surfaces of screens 16 will be blown off the filter element and will fall into collecting hopper 23. The hopper can occassionally be drained through valve 24, and, after separation of the filter cake particles from the granular bed material, the latter material can be recirculated to hooper 20.

The material which is thus removed from filter element 12 is then replaced by bed granules flowing by gravity through the openings provided between screens 16 and the trailing edges of louvres 15. The granule supply in hopper 20 insures that filter element 12 is fully supplied with needed bed material.

If louvres 15 are formed of screen material, as they could be as indicated above, particulate matter entering the filter element 12 through louvres 15 would initially remain in the filter element during cleaning operations, but after successive blow backs, the granules supported by a louvre would work themselves downwardly along a louvre until they reached the opening at the trailing edge of a louvre whereupon they would slide out onto the upper surface of screen 16 carrying the filtered particulates with them.

While the description has referred to the filtering of particulate matter, as noted above the present invention is particularly suited to situations where the feed gas reacts with the granules of bed 13. In such cases the foregoing description is equally applicable, except that blow backs will take place when the material supported on screen has lost its ability to react with the feed gas. In both cases, filtering operations and reactive operations, cleaning of filter element 12 is controlled by the frequency of blow backs.

Figure 2:
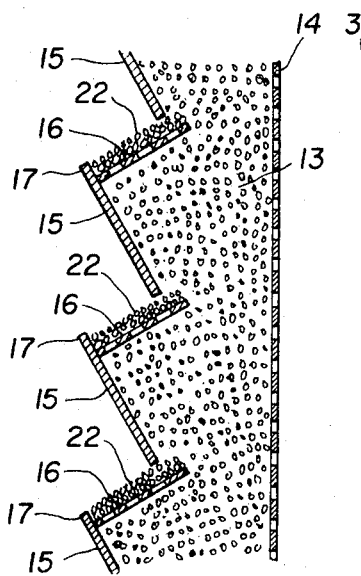
FIG. 2 is an enlarged detail view of the slat arrangement of the filter.
Figure 3:
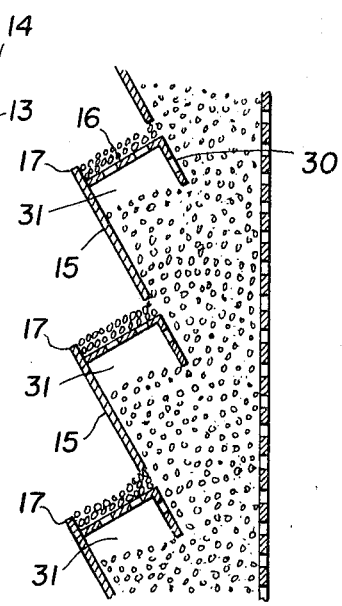
FIG. 3 is an enlarged view similar to FIG. 2 of a different embodiment of the invention.

A different embodiment of the invention is shown in FIG. 3. In this arrangement, screen 16 is provided with a downwardly angled slat 30 that is substantially aligned with the louvre 15 next above the screen. Like screen 16 slat 30 may be perforated as long as the perforations are smaller than the size of the granules making up bed 13, or, it may be imperforate. With this construction, as the granular material is fed into filter element 12 from supply hopper 20 it will fill up the filter element and pass through the openings between louvres 15 and screens 16 so as to form a thin bed of material on top of screen 16. This thin bed of granular material is retained in place by lip 17. However, because of slat 30, an empty pocket 31 will be provided in that part of the filter element below screen 16. The depth of the pocket will be determined by the length of slat 30 which prevents the granular material flowing into the pocket. This embodiment provides, in effect, a two stage filter-reactor having two beds, separated by pocket 31, through which the feed gas flows. Here again as in the FIG. 2 embodiment, when it is desired to remove filter media by blowing back through the filter element only a controlled and limited amount of filter media is removed from the filter element.

Figure 4:
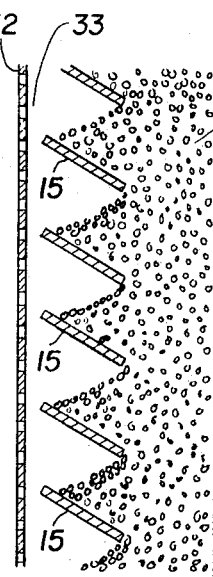
FIG. 4 is a detailed view of still another embodiment of the invention.

Still another embodiment of the invention is shown in FIG. 4. In the construction here illustrated screens 16 may be omitted and a perforated wall 32, substantially parallel to wall 14, provided spaced a small distance in front of the leading edges of louvres 15. The perforations in wall 32 are smaller than the size of the granular material used for filter bed 13. With such an arrangement of filter components, when a blow back occurs during a cleaning operation, the filter bed will be raised against wall 32 and a limited number of granules, depending on the spacing 33 between wall 32 and the leading edges of louvres 15 and the duration of the blow back, will fall through spacing 33 to a collection hopper located below the filter element. Of course wall 32 could abut louvres 15 without any spacing therebetween, but in that case apertures large enough to pass the granules of the filter bed would be provided along the leading edge of louvres 15. The number and size of the apertures would then, along with the duration of the blow back, determine the amount of filter media removed during a blow back operation.

In the three embodiments disclosed, it has been pointed out that instead of one element being spaced from another to provide an opening therebetween, e.g., the upper edge of screen 16 and the trailing edge of louvre 15, and wall 32 and the leading edges of louvre 15, the elements could be joined and apertures formed in one of the elements to allow the passage of filter media therethrough. Such joining of elements may be preferred in order to give the filter element structural strength and rigidity. In the two examples mentioned, the apertures would be provided, respectively, at the trailing edge of louvre 15 just above where screen 16 joins the louvre, and in the second case, at the leading edge of louvre 15 where it is joined to wall 32. Therefore, the language used in the claims to define this feature is intended to cover both constructions even though it might appear to cover only one.

Having thus described my invention it should be obvious that many apparently different embodiment could be made without departing from its spirit and scope, and hence it is to be understood that the foregoing specification and the drawing are to be interpreted as illustrative rather than in a limiting sense.

What is claimed is:

1. A granular bed filter-reactor comprising a pair of spaced apart angularly disposed members arranged one above the other and defining a fluid entry passageway therebetween, each of said members having a leading edge and a trailing edge, a perforate wall member substantialy parallel to the plane defined by said pair of spaced apart members, a bed of granular material between said wall member and said pair of spaced apart members, said bed extending also between said spaced apart members, means for feeding material to said granular bed of the filter-reactor, means for blowing a gas through said granular bed in the reverse direction whereby a portion of said granular bed is expelled through said entry passageway, mechanical means for limiting the amount of said granular bed expelled during a reverse blow of gas through said granular bed including a screen member having openings therein smaller than the particle size of the granular bed material, said screen member extending from below the leading edge of the lower of the pair of spaced apart members to a point below the trailing edge of the upper of the pair of spaced apart members, whereby an opening is left between said screen member and the upper member of the spaced apart members to permit material from the granular bed to flow onto the screen member and the leading edge of the lower of the pair of spaced apart members provides a lip that retains said material on said screen member, and means for collecting the material expelled from the granular bed.

2. A granular bed filter-reactor according to claim 1 including a plurality of spaced apart members arranged one above the other, and a plurality of screen members each extending from below the leading edge of a different one of said spaced apart members to near the trailing edge of the spaced apart member next above.

3. A granular bed filter-reactor according to claim 2 wherein said spaced apart members are perforated and the perforations are sized to prevent the passage of material from the granular bed therethrough.

4. A granular bed filter-reactor according to claim 2 wherein each screen member is provided with an element at its trailing edge disposed at an angle to the screen member and extending away from but substantially in line with the spaced apart member above said screen member, the arrangement being such that the material of said granular bed will not flow into a pocket formed by the screen member, the angularly disposed element thereof, and the spaced apart member below and to which said screen member is fastened.

5. A granular bed filter-reactor according to claim 1 wherein said screen member is disposed at an angle to the horizontal slightly greater than the angle of repose of the material in the granular bed.

* * * * *